(12) United States Patent
Lian

(10) Patent No.: US 8,936,738 B2
(45) Date of Patent: Jan. 20, 2015

(54) DISPOSAL METHOD FOR ENTIRELY RECYCLING SOLID REFUSE

(76) Inventor: Qihui Lian, Guangdong (CN)

( * ) Notice: Subject to any disclaimer, the term of this patent is extended or adjusted under 35 U.S.C. 154(b) by 745 days.

(21) Appl. No.: 12/670,403

(22) PCT Filed: Jul. 21, 2008

(86) PCT No.: PCT/CN2008/001346
§ 371 (c)(1), (2), (4) Date: Jan. 24, 2010

(87) PCT Pub. No.: WO2009/012653
PCT Pub. Date: Jan. 29, 2009

(65) Prior Publication Data
US 2010/0187708 A1    Jul. 29, 2010

(30) Foreign Application Priority Data

Jul. 25, 2007 (CN) .......................... 2007 1 0029339

(51) Int. Cl.
| | |
|---|---|
| *B09B 3/00* | (2006.01) |
| *C04B 33/132* | (2006.01) |
| *C04B 33/135* | (2006.01) |
| *C04B 35/626* | (2006.01) |
| *C10B 53/00* | (2006.01) |
| *C10B 53/08* | (2006.01) |
| *C10L 5/36* | (2006.01) |
| *C10L 5/46* | (2006.01) |
| *C10L 9/08* | (2006.01) |
| *B03B 9/06* | (2006.01) |
| *C04B 18/04* | (2006.01) |

(52) U.S. Cl.
CPC ............. *B09B 3/0025* (2013.01); *C04B 18/04* (2013.01); *Y10S 264/911* (2013.01); *C04B 33/1328* (2013.01); *C04B 33/135* (2013.01); *C04B 35/6267* (2013.01); *C10B 53/00* (2013.01); *C10B 53/08* (2013.01); *C10L 5/361* (2013.01); *C10L 5/363* (2013.01); *C10L 5/46* (2013.01); *C10L 9/083* (2013.01); *Y02E 50/10* (2013.01); *Y02E 50/15* (2013.01); *Y02E 50/30* (2013.01); *Y10S 264/915* (2013.01)
USPC .......... 264/29.1; 264/319; 264/320; 264/330; 264/911; 264/915; 201/6; 201/8

(58) Field of Classification Search
USPC ............... 264/29.1, 29.7, 319, 320, 330, 911, 264/915; 201/5, 6, 7, 8, 35, 36, 37
See application file for complete search history.

(56) References Cited

U.S. PATENT DOCUMENTS

| | | | | |
|---|---|---|---|---|
| 1,898,326 | A * | 2/1933 | Wahlstrom | 201/6 |
| 3,841,974 | A * | 10/1974 | Osborne | 201/2.5 |
| 4,272,322 | A * | 6/1981 | Kobayashi | 201/6 |
| 4,596,584 | A * | 6/1986 | Darby | 44/576 |
| 4,863,488 | A * | 9/1989 | Maeda et al. | 44/589 |
| 6,669,822 | B1 * | 12/2003 | Fujimura et al. | 201/37 |
| 7,866,977 | B2 * | 1/2011 | Von Blucher et al. | 432/118 |
| 2006/0281633 | A1* | 12/2006 | Wang | 502/430 |
| 2007/0031772 | A1* | 2/2007 | Von Blucher et al. | 432/118 |

FOREIGN PATENT DOCUMENTS

| | | | |
|---|---|---|---|
| CN | 1644492 A | * | 7/2005 |
| CN | 1651550 A | * | 8/2005 |
| CN | 1850696 A | * | 10/2006 |
| KR | 2003076814 A | * | 9/2003 |
| KR | 2004018022 A | * | 3/2004 |
| KR | 2004099909 A | * | 12/2004 |

\* cited by examiner

*Primary Examiner* — Atul P. Khare
(74) *Attorney, Agent, or Firm* — Tianhua Gu; Global IP Services

(57) ABSTRACT

A disposal method for entirely recycling solid refuse includes the following steps: sorting, crushing, drying, pressing with high pressure to shaped articles, producing charcoal from combustible refuse in high temperature and firing incombustible refuse in high temperature, at last cooling high temperature articles to obtain solid fuel with various shapes and bricks or board used for building. The method achieves entirely recycling house refuse, especial solid refuse. The method recycles solid refuse to obtain fuel and building material with economic value. The method is simple and its processing cost is low.

9 Claims, No Drawings

DISPOSAL METHOD FOR ENTIRELY RECYCLING SOLID REFUSE

The present application is the US national stage of PCT/CN2008/001346 filed on Jul. 21, 2008, which claims the priority of the Chinese patent application No. 200710029339.4 filed on Jul. 25, 2007, which application is incorporated herein by reference.

FIELD OF THE INVENTION

The present invention relates to a disposal method of house refuse, and more particularly, to a disposal method for entirely recycling solid refuse, which invention belongs to the art of environment protection.

BACKGROUND OF THE INVENTION

Whilst house refuse is one of the common hazards to harm sustainable development of the social economy, it is also the only potential resource with considerable growth. How to dispose the urban house refuse which pollutes earth, water and air and is detrimental to both environment quality and human health, and how to utilize the recyclable and revivable part of the refuse in an effective and efficient way to achieve reduction, decontamination and resource utilization of house refuse are major issues of environmental protection around the world. The disposal of house refuse is more and more important for the sake of human beings' living and ecological environment. With the rapid development of social economies and the improvement of people's living standards, substantial changes are noticed in both quality and quantity of house refuse in recent years. House refuse used to come from food and other organic wastes in the past whereas paper-made and indecomposable plastic products are raising their share in the composition of modern house refuse at present.

Currently, the main disposal methods of house refuse are landfills, incineration and recycling. Landfill is highly demanding for land to bury the crushed wastes. As the plastic wastes, which are decomposed difficultly, occupy a large proportion of house refuse, the lands for landfill tend to lose the agricultural productivity. Incineration of waste material can produce heat, which can be used to generate electric power. However, the remains of combustion such as incinerator bottom ash, flue gases and particulates must be further processed to prevent secondary pollution. Recycling is a comparative ideal method for waste treatment as it processes used materials into new products and energy. The marsh gas and the fertilizer produced from recycling of house refuse are as cases in point. Nevertheless, residual wastes cannot be eliminated through recycling and therefore, the secondary pollution is unavoidable, definitely harming environment quality and human health in the long run.

SUMMARY OF THE INVENTION

An objective of the present invention is to provide a disposal method for entirely recycling solid refuse to protect human living environment, to release conflicts between human life and survival and to obtain economic benefits by reusing wastes as raw materials in manufacturing and converting solid refuse into materials with economic value.

In order to achieve the above objective, the following steps should be taken according to the invention:

1. Drying, to dry the solid refuse.
2. Pressing and Shaping with High Pressure, to press the solid refuse into block articles with various shapes at a high pressure condition.
3. Carbonization and/or Firing at a High Temperature; to carbonize the combustible refuse to form charcoal and to fire the incombustible refuse at the high temperature to obtain bricks or boards with various shapes for building, and then to cool to the bricks or boards to obtain the finished products of the bricks or boards.

The present invention is further improved by the dehydration process respectively prior to sorting, crushing and drying.

The present invention is also further improved by using the high-temperature heating in the high-pressure pressing and shaping process.

The present invention requires a temperature of drying between 100° C. and 500° C. and a duration time of drying between 30 seconds and 30 minutes.

The present invention requires a pressure scope between 10 kg and 30 kg per cm square.

The present invention requires a temperature of carbonization between 300° C. and 1300° C. and a duration time of carbonization between 5 seconds and 18 minutes.

The present invention requires a temperature of high-temperature firing between 700° C. and 1200° C. and a duration time of high-temperature firing between 1 hour and 10 hours.

In order to achieve the above objective, the following steps should be taken according to the invention:

1. Sorting: to categorize the solid refuse into combustible refuse and incombustible refuse.
2. Crushing: to crush the sorted refuse into smaller pieces with disintegrators.
3. Drying: to dry the sorted solid refuse.
4. Pressing and shaping at a high Pressure: to press the solid refuse respectively into shaped articles with high pressure.
5. Carbonization and/or firing at a high Temperature: to carbonize the combustible refuse to form charcoal, and to fire the incombustible refuse at a high temperature to obtain bricks or boards with various shapes for building, and then to cool to the bricks or boards to obtain the finished products of the bricks or boards.

In order to achieve the above objective, the following steps should be taken according to the invention:

1. Sorting: to categorize the solid refuse into combustible refuse and incombustible refuse.
2. Crushing: to crush the sorted refuse into smaller pieces with disintegrators.
3. Pressing and shaping at a high pressure: to press the solid refuse respectively into block articles with various shapes at a high pressure condition.
4. Carbonization and/or firing at a high temperature: to carbonize the combustible refuse to form charcoal, and to fire the incombustible refuse at a high temperature to obtain bricks or boards with various shapes for building, and then to cool the bricks or boards to obtain the finished products of the bricks or boards.

The present invention requires a temperature of carbonization between 300° C. and 1300° C. and a duration time of carbonization between 5 seconds and 18 minutes; and the present invention requires a temperature of high-temperature firing between 700° C. and 1200° C. and a duration time of high-temperature firing between 1 hour and 10 hours.

Due to the aforesaid steps, the present invention realizes the entire recycling of wastes and relieves the pollution problems arising from conventional waste disposal by converting house refuse, especially for the solid refuse, into power sources (charcoal and fuel) and building material with economic value. Moreover, considerable economic benefits are possibly obtained via this invention since the processing is simple and cost-efficient and the required equipments are highly available.

DETAILED DESCRIPTION AND EXAMPLES OF THE INVENTION

Example One

Firstly, the drying process of the present invention can be conducted through conventional dry-off oven, which demands a temperature of 500° C. and 30-second operating time. It can also be finished by other similar equipments or even sunlight. During the whole drying process, higher temperature conditions demands less operating time.

Secondly, in the condition of high temperature (300° C.) and high pressure (10 kg per cm square), the press squeezes the refuse into various shapes, such as cube, cylinder or bar. The higher pressure tends to produce semi-finished articles of better quality. Due to the glutinosity of combustible refuse, high-temperature heating is a crucial part of the process in case of any adhesion between the press and the refuse in process (the aforesaid process is also applicable to incombustible refuse except that high-temperature heating is not compulsorily required in pressing and shaping process since incombustible refuse does not have such a conglutination problem).

Thirdly, the shaped refuse are carbonized at a high temperature of 450° C. for 6 minutes to produce the charcoal. The higher temperature of processing can shorten the operating time. Since differences exist in the composition of the original refuse, the thickness of the semi-finished products and the processing temperature and operating duration time, different finished products such as charcoal and briquette in various shapes are ultimately obtained after process of cooling. These finished products are combustible with high thermal energy and low sulfuric ingredients, which are highly environmental friendly.

Example Two

The first step of the present invention is to manually or automatically sort the house refuse into combustible and incombustible categories. In this step, metal refuse with high economic value can be separated and sold directly.

Second, the combustible refuse are dehydrated by water extractor, crushed into particles, preferably powders and dried at a temperature of 100° C. for 30 minutes with either dry-off oven, other similar equipments or sunlight. During the whole drying process, higher temperature conditions demands less operating time.

Third, in the condition of high temperature of 100° C. and high pressure 1 kg per cm square, the press squeezes the refuse into various shapes such as cube, cylinder or bar. Due to the glutinosity of combustible refuse, high-temperature heating is a crucial part of the process in case of any adhesion between the press and the refuse in process.

Fourth, the shaped refuse are carbonized at a high temperature of 300° C. for 18 minutes to produce the charcoal. Higher temperature of processing can shorten the operating time. Since differences exist in the composition of the original refuse, the thickness of the semi-finished products and the processing temperature and operating duration time, different finished products such as charcoal and briquette in various shapes are ultimately obtained after process of cooling. These finished products are combustible with high thermal energy and low sulfuric ingredients, which are more environmental friendly than the common fuel.

Example 3

The first step of the present invention is to manually or automatically sort the house refuse into combustible and incombustible categories. In this step, metal refuse with high economic value can be separated and sold directly.

Second, the combustible refuse are dehydrated by water extractor, crushed into particles, preferably powders and dried at a temperature of 500° C. for 50 seconds with either dry-off oven, other similar equipments or sunlight. During the whole drying process, higher temperature conditions demands less operating time.

Third, in the condition of high temperature of 500° C. and high pressure 30 kg per cm square, the press squeezes the refuse into various shapes such as cube, cylinder or bar. Due to the glutinosity of combustible refuse, high-temperature heating is a crucial part of the process in case of any adhesion between the press and the refuse in process.

Fourth, the shaped refuse are carbonized at a high temperature of 1300° C. for 5 seconds to produce the charcoal. Higher temperature of processing can shorten the operating time. Since differences exist in the composition of the original refuse, the thickness of the semi-finished products and the processing temperature and operating duration time, different finished products such as charcoal and briquette in various shapes are ultimately obtained after process of cooling. These finished products are combustible with high thermal energy and low sulfuric ingredients, which are more environmental friendly than the common fuel.

Example 4

The first step of the present invention is to manually or automatically sort the house refuse into combustible and incombustible categories. In this step, metal refuse with high economic value can be separated and sold directly.

Second, the combustible refuse are dehydrated by water extractor, crushed into particles, preferably powders and dried with either dry-off oven, other similar equipments or sunlight. During the whole drying process, higher temperature conditions demands less operating time.

Third, in the condition of high temperature of 350° C. and high pressure 20 kg per cm square, the press squeezes the refuse into various shapes such as cube, cylinder or bar. The higher pressure tends to produce semi-finished articles of better quality. Due to the glutinosity of combustible refuse, high-temperature heating is a crucial part of the process in case of any adhesion between the press and the refuse in process.

Fourth, the shaped refuse are carbonized at a high temperature of 650° C. for 9 minutes to produce the charcoal. Higher temperature of processing can shorten the operating time. Since differences exist in the composition of the original refuse, the thickness of the semi-finished products and the processing temperature and operating duration time, different finished products such as charcoal and briquette in various shapes are ultimately obtained after process of cooling. These finished products are combustible with high thermal energy and low sulfuric ingredients, which are more environmental friendly than the common fuel.

Example 5

The present example is to describe the disposal method of incombustible refuse. The sorting, dehydrating, crushing, drying processes are almost the same as their counterparts in Example 2, Example 3 and Example 4 except that the produced particles in the crushing process are not necessarily as small as those in the examples above. In the process of pressing and shaping at high pressure, as the incombustible refuse are not sufficiently glutinous, clay should be added to enhance its viscidity, facilitating the high-pressure shaping of the refuse (high temperature condition is optional in this case). Furthermore, the firing of shaped refuse must be conducted at a high temperature of 700° C. for 10 hours in order to obtain the building materials with sufficient hardness and intensity. Bricks or board in various shapes for building are accessible though the final cooling.

Example 6

The present example is to describe the disposal method of incombustible refuse. The sorting, dehydrating, crushing, drying processes are almost the same as their counterparts in Example 2, Example 3 and Example 4 except that the produced particles in the crushing process are not necessarily as small as those in the examples above. In the process of pressing and shaping at a high pressure, as the incombustible refuse are not sufficiently glutinous, clay should be added to enhance its viscidity, facilitating the high-pressure shaping of the refuse (high temperature condition is optional in this case). Furthermore, the firing of shaped refuse must be conducted at a high temperature of 1200° C. for one hour in order to obtain the building materials with sufficient hardness and intensity. Bricks or board in various shapes for building are accessible though the final cooling.

Example 7

The present example is to describe the disposal method of incombustible refuse. The sorting, dehydrating, crushing, drying processes are almost the same as their counterparts in Example 2, Example 3 and Example 4 except that the produced particles in the crushing process are not necessarily as small as those in the examples above. In the process of pressing and shaping at a high pressure, as the incombustible refuse are not sufficiently glutinous, clay should be added to enhance its viscidity, facilitating the high-pressure shaping of the refuse.

What is claimed is:

1. A method for entirely recycling solid refuse comprising combustible and incombustible components, the method comprising:

sorting the solid refuse into combustible and incombustible refuse categories;

dehydrating each of the combustible and incombustible refuse categories using water extractors;

crushing each of the dehydrated combustible and incombustible refuse categories into smaller pieces using disintegrators;

drying each of the crushed combustible and incombustible refuse categories;

pressing and shaping each of the dried combustible and incombustible refuse categories into articles having various shapes using presses applying high pressure, the press for combustible refuse also applying a high temperature selected to prevent combustible refuse from sticking thereto;

carbonizing the pressed and shaped combustible refuse at a temperature between 300° C. and 1300° C. for a time between 5 seconds and 18 minutes so as to form charcoal and briquette having various shapes;

firing the pressed and shaped incombustible refuse at a temperature between 700° C. and 1200° C. for a time between 1 hour and 10 hours so as to form building bricks or boards having various shapes; and cooling the charcoal, briquette, and bricks or boards so as to obtain finished products.

2. The method according to claim 1, wherein said drying is conducted at a temperature between 100° C. and 500° C. for a time between 30 seconds and 30 minutes.

3. The method according to claim 1, wherein said pressing and shaping is conducted at a temperature between 100° C. and 500° C. under a pressure between 10 and 30 kg/cm$^2$.

4. The method according to claim 1, wherein the various shapes comprise cube, cylinder, or bar shapes.

5. The method according to claim 1, wherein said sorting further comprises separating out metal refuse having high economic value for direct sale.

6. The method according to claim 1, wherein said crushing of combustible refuse forms powder.

7. The method according to claim 1, wherein said crushing of incombustible refuse produces particles which are not as small as particles formed by said crushing of combustible refuse.

8. The method according to claim 1, further comprising adding clay to the incombustible refuse for said pressing and shaping thereof.

9. The method according to claim 1, wherein the charcoal and briquette are combustible with high thermal energy and low sulfuric ingredients.

* * * * *